(12) United States Patent
Fontaine et al.

(10) Patent No.: US 10,458,444 B2
(45) Date of Patent: Oct. 29, 2019

(54) OPTIMIZED METHOD FOR CONTROLLING POSITION AND CROSSOVER PRESSURE IN A DOUBLE ACTING ACTUATOR

(71) Applicant: FISHER CONTROLS INTERNATIONAL LLC, Marshalltown, IA (US)

(72) Inventors: Michael R. Fontaine, Marshalltown, IA (US); David L. Smid, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 172 days.

(21) Appl. No.: 15/718,960

(22) Filed: Sep. 28, 2017

(65) Prior Publication Data

US 2019/0093682 A1 Mar. 28, 2019

(51) Int. Cl.
| | |
|---|---|
| *F15B 15/20* | (2006.01) |
| *F15B 15/14* | (2006.01) |
| *F15B 21/08* | (2006.01) |
| *G05B 19/44* | (2006.01) |

(52) U.S. Cl.
CPC .............. *F15B 15/20* (2013.01); *F15B 15/14* (2013.01); *F15B 21/087* (2013.01); *G05B 19/44* (2013.01); *F15B 2211/6313* (2013.01); *F15B 2211/6336* (2013.01); *F15B 2211/665* (2013.01); *F15B 2211/6653* (2013.01); *F15B 2211/6656* (2013.01); *F15B 2211/7053* (2013.01); *F15B 2211/8855* (2013.01)

(58) Field of Classification Search
CPC ........ F15B 15/087; F15B 15/20; F15B 21/14; F15B 2211/6313; F15B 2211/6336; F15B 2211/6653; F15B 2211/6656; F15B 2211/7053; F15B 2211/8855

See application file for complete search history.

(56) References Cited

U.S. PATENT DOCUMENTS

| | | | |
|---|---|---|---|
| 6,041,264 A | 3/2000 | Wruck et al. | |
| 6,909,975 B2 * | 6/2005 | Dozoretz | ................ G01L 13/00 702/45 |

(Continued)

OTHER PUBLICATIONS

International Search Report and Written Opinion for International Application No. PCT/US2018/050419, dated Jan. 18, 2019.

*Primary Examiner* — Mohamed Charioui
(74) *Attorney, Agent, or Firm* — Marshall, Gerstein & Borun LLP

(57) ABSTRACT

Systems and methods may be provided to digitally control both position and crossover pressure in a double-acting pneumatic actuator, in view of constraints (e.g., a deadband range comprising a set point) set on the crossover pressure. Control may be achieved, via a control algorithm (e.g., a Multiple Input Multiple Output (MIMO) control algorithm) acting upon inputs of actuator position feedback and crossover pressure feedback (e.g., as indicated by pressure feedback of each respective pneumatic chamber). Further, the embodiments described herein may reduce the necessary frequency of control actions for adjusting crossover pressure, thus reducing wear on process components, and allowing for finer control of actuator position.

20 Claims, 5 Drawing Sheets

(56) References Cited

U.S. PATENT DOCUMENTS

| | | | |
|---|---|---|---|
| 6,999,853 B2 * | 2/2006 | Junk | F15B 5/006 251/129.01 |
| 8,728,108 B2 * | 5/2014 | Gao | A61F 9/00736 137/487.5 |
| 2009/0199703 A1 | 8/2009 | Hoffmann et al. | |
| 2018/0061679 A1 * | 3/2018 | Silveira | H01J 37/32899 |

* cited by examiner

OPTIMIZED METHOD FOR CONTROLLING POSITION AND CROSSOVER PRESSURE IN A DOUBLE ACTING ACTUATOR

FIELD OF THE INVENTION

The disclosure relates generally to control valves and, and more particularly, to control methods and systems for controlling a double-acting pneumatic actuator acting upon a control valve.

BACKGROUND

Many industrial process control systems use control valves to control the flow rates of process fluids through pipes. Conventionally, a control valve may be opened and closed via an actuator, wherein a position of the actuator may be set according to positioning signals generated via a positioner based upon process settings, feedback from an actuator position sensor, and/or other input. In some process environments, the actuator may be a double-acting pneumatic actuator comprising two pneumatic chambers, wherein a pressure differential of pneumatic fluid supplied to each chamber pushes bidirectionally on a piston connected to a stem. The stem, in turn, translates the motion of the piston to adjust an opening of the control valve to increase or decreased flow rate of a process fluid.

A primary goal of a valve positioner and actuator combination is to quickly and accurately control fluid flow through the control valve via controlling actuator position. Another major goal of the combination is to minimize undesirable deviations in the actuator position as a result of forces generated by the flow of the process fluid itself, and/or other environmental forces.

Susceptibility of the actuator position to such forces may vary based upon a stiffness of the actuator, which, in the case of the double-acting pneumatic actuator, may be expressed as an average of the pressures (this average sometimes referred to as "crossover pressure") of the two pneumatic chambers. Low actuator stiffness (i.e., low crossover pressure between the two chambers) may leave the actuator more susceptible to position deviations caused by process fluid forces and/or other forces, which may additionally cause increased wear and tear on the actuator. A high actuator stiffness (i.e., high crossover pressure), may impede desired actuator movement.

Thus, actuator stiffness presents an engineering trade-off between ability to rapidly control actuator position and mitigation of buffeting forces that may cause undesired deviations in the actuator position. Conventionally, stiffness in a double-acting pneumatic actuator may be adjusted via a mechanical adjustment, often in the form of a pneumatic bleed to "drain" undesired pressure from the pneumatic chambers. However, such practices may be time-consuming, inexact, and wasteful of pneumatic fluid. Ability to more precisely define and maintain actuator stiffness would therefore improve quality, durability, and efficiency in a process control environment.

SUMMARY

Embodiments of methods and a corresponding system of this disclosure may digitally control both position and stiffness (also referred to herein as "crossover pressure") in a double-acting pneumatic actuator, in view of constraints (e.g., a deadband range comprising a set point) set on the crossover pressure. Control may be achieved, via a control algorithm (e.g., a Multiple Input Multiple Output (MIMO) control algorithm) acting upon inputs of actuator position feedback and crossover pressure feedback (e.g., as indicated by pressure feedback of each respective pneumatic chamber). Further, the embodiments described herein may reduce the necessary frequency of control actions for adjusting crossover pressure, thus reducing wear on process components, and allowing for finer control of actuator position (e.g., via the same improved technique, via the previously described traditional technique, and/or via other control techniques).

In a possible embodiment, a computer-implemented method may be provided for digitally controlling crossover pressure in a double-acting pneumatic actuator. The method may comprise (1) monitoring a crossover pressure over two pneumatic chambers of the double-acting pneumatic actuator; (2) determining that the monitored crossover pressure is outside of a predefined deadband range, wherein the deadband range corresponds to a range of crossover pressure values extending above and below a crossover pressure set point; (3) in response to determining that the monitored crossover pressure is outside of the deadband range, calculating a difference between the monitored crossover pressure and the set point, and using the calculated difference to set a crossover pressure error variable; (4) executing a control algorithm using the error variable, to drive the monitored crossover pressure to the set point; and/or (5) in response to determining that the monitored crossover pressure has reached the set point, setting the error variable to zero while the monitored crossover pressure remains within the deadband range. The method may comprise additional, fewer, or alternate actions, including those described herein.

In another possible embodiment, a system may be provided for digitally controlling crossover pressure in a double-acting pneumatic actuator. The system may comprise (1) a first sensor to obtain a first pressure measurement indicative of pressure in a first chamber of two pneumatic chambers of the double-acting pneumatic actuator; (2) a second sensor to obtain a second pressure measurement indicative of pressure in a second chamber of the two pneumatic chambers; and (3) a processing unit configured to (i) monitor a crossover pressure over the two pneumatic chambers using the first and second pressure measurements, (ii) determine that the monitored crossover pressure is outside of a predefined deadband range, wherein the deadband range corresponds to a range of crossover pressure values extending above and below a crossover pressure set point, (iii) in response to determining that the monitored crossover pressure is outside of the deadband range, calculate a difference between the monitored crossover pressure and the set point, and use the calculated difference to set a crossover pressure error variable, (iv) execute a control algorithm using the error variable, to drive the monitored crossover pressure to the set point, and/or (v) in response to determining that the monitored crossover pressure has reached the set point, set the error variable to zero while the monitored crossover pressure remains within the deadband range. The system may comprise additional, fewer, or alternate components and/or functions thereof, including those described herein.

In yet another possible embodiment, a controller may be provided may be provided for digitally controlling crossover pressure in a double-acting pneumatic actuator. The controller may be configured to (1) receive a first pressure measurement indicative of pressure in a first chamber of two pneumatic chambers of the double-acting pneumatic actuator; (2) receive a second pressure measurement indicative of pressure in a second chamber of the two pneumatic chambers; (3) monitor a crossover pressure over the two pneumatic chambers using the first and second pressure measurements; (4) determine that the monitored crossover pressure is outside of a predefined deadband range, wherein the deadband range corresponds to a range of crossover pressure values extending above and below a crossover pressure set point; (5) in response to determining that the monitored crossover pressure is outside of the deadband range, calculate a difference between the monitored crossover pressure and the set point, and use the calculated difference to set a crossover pressure error variable; (6) execute a control algorithm using the error variable, to drive the monitored crossover pressure to the set point; and/or (7) in response to determining that the monitored crossover pressure has reached the set point, set the error variable to zero while the monitored crossover pressure remains within the deadband range. The controller may be configured to perform additional, fewer, or alternate actions, including those described herein.

DETAILED DESCRIPTION

Figure 1:
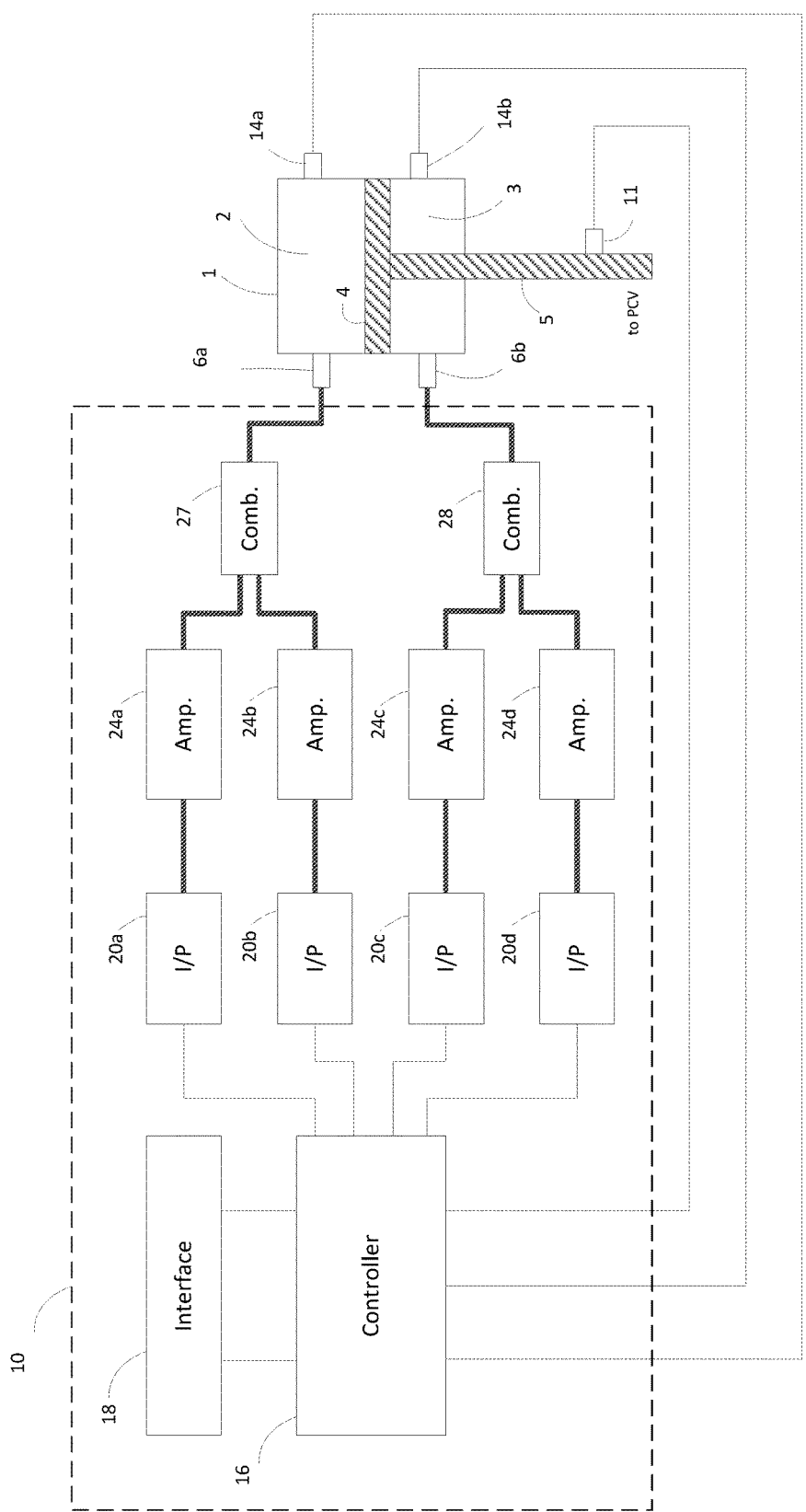
FIG. 1 is a block diagram of an example control valve positioning system configured to operate a double-acting pneumatic actuator.

Although the following text sets forth a detailed description of one or more exemplary embodiments of the invention, it should be understood that the legal scope of the invention is defined by the words of the claims set forth at the end of this patent. Accordingly, the following detailed description is to be construed as exemplary only and does not describe every possible embodiment of the invention, as describing every possible embodiment would be impractical, if not impossible. Numerous alternative embodiments could be implemented, using either current technology or technology developed after the filing date of this patent. It is envisioned that such alternative embodiments would still fall within the scope of the claims defining the invention.
Example System Including a Double-Acting Actuator FIG. 1 illustrates an implementation of a system comprising a double-acting actuator 1 and a positioner 10 for controlling the actuator 1. In some implementations, the positioner 10 may configured to include some or all of the advanced functionality of a digital valve controller (DVC), though FIG. 1 does not illustrate this functionality. The actuator 1 may comprise an upper pneumatic chamber 2 and a lower pneumatic chamber 3, which may be separated by a piston 4. A pressure differential between the upper pneumatic chamber 2 and the lower pneumatic chamber 3 may cause movement of the piston 4, which may in turn cause movement of a stem 5 connected to the piston 4. Movement of the stem 5 (e.g., linear or angular displacement of the stem 5) may open or close a process control valve (PCV) through which process fluid may flow. The process control valve may control fluid flow within a process control system, such as a chemical or other process control plant.

An inlet/outlet 6a may supply air or other control fluid to the upper pneumatic chamber 2, and/or conversely, may exhaust control fluid from the upper pneumatic chamber 2. Likewise, an inlet/outlet 6b may supply control fluid to and/or exhaust control fluid from the lower pneumatic chamber 3. As the amount of control fluid changes in either or both of the chambers 2 and 3, a control fluid pressure differential in the chambers 2 and 3 may cause positional movement of the piston 4 and stem 5 to partially or fully open or close the control valve. The term "actuator position," as used herein, may refer to the position of the stem 5 as a result of pneumatic chambers 2 and 3 of the double-acting pneumatic actuator 1.

In some implementations, the double-acting actuator 1 may include a spring (not shown) in one or both of the chambers 2 and 3 for fail-open or fail-closed action. Such a spring may place an actuator at one limit of the actuators range when, for example, either of the chambers 2 and 3 depressurize due to a leak. The spring may offset the balance between the two chamber pressures.

In some implementations, a mechanism in an alternative actuator 1 may translate the linear motion of the piston 4 into rotary motion of the stem 5 by means of rack and pinion, scotch yoke, or another mechanism. In these implementations, the actuator 1 may comprise one or more pistons and two or more pneumatic chambers.

A position sensor 11 may be configured to detect the position of the actuator 1, for example, by detecting linear displacement of the stem 5. In implementations with an alternative rotary actuator, an alternative position sensor 11 may be configured to measure angular displacement of some portion of the alternative rotary actuator. A pressure sensor 14a may be configured to detect an amount of pneumatic pressure in the upper pneumatic chamber 2. Similarly, a pressure sensor 14b may be configured to detect an amount of pneumatic pressure in the lower pneumatic chamber 3. In some implementations, the pressure sensors 14a and 14b may be located at outlet ports of the respective chambers 2 and 3. Additionally or alternatively, the pressure sensors 14a and 14b may be integrated into the body of the positioner 10, and connected to the respective chambers 2 and 3 via pneumatic lines. In any case, the position sensor 11 and pressure sensors 14a and 14b may be communicatively connected to a processing unit 16 to provide feedback of observed actuator position and pressure to the processing unit 16.

The processing unit 16 may be configured to receive position feedback from the position sensor 11, and/or pressure feedback from the pressure sensors 14a and 14b. In some implementations, the processing unit may comprise one or more microprocessors. In other implementations, the processing unit may comprise field programmable gate arrays (FPGAs) or analog circuits. The processing unit 16 may be configured to execute a control algorithm (e.g., a Multiple Input Multiple Output (MIMO) control algorithm) to output electrical control signals to respective current-to-pressure (I/P) transducers 20a-20d for generating pneumatic signals for the actuator 1. The processing unit 16 may additionally be configured to compute other signals, such as diagnostic information about the positioner and the actuator.

The positioner 10 may additionally comprise an interface 18 communicatively coupled to the processing unit 16, wherein the processing unit 16 may include wired and/or wireless connections, circuitry for communications and signal processing, non-transient memory and/or a human-machine interface. In some embodiments, the interface 18 may communicate actuator control constraints, process variable set points, and/or other information, that may be defined by a human operator and/or a control algorithm. The set point of position may be a dynamically changing value which is communicated by a process controller to the interface using a predetermined communication protocol. The constraint on actuator stiffness, on the other hand, may not need to change dynamically. In implementations with preset constraints on the stiffness, the processing unit 16 may access the interface 18 to retrieve the stiffness constraint, for example, by accessing nonvolatile memory where the constraint may be stored.

In any case, the processing unit 16 may output electrical signals for controlling the actuator 1, the electrical signals transmitted to the I/P transducers 20a-20d, each of which may be connected to a corresponding pneumatic amplifier 24a-24d which may amplify the flow rates specified via the respective transducers 20a-20d. I/P transducer 20a and the corresponding pneumatic amplifier 24a are fluidly connected to the supply of pressurized control fluid, while 20b and the corresponding pneumatic amplifier 24b are fluidly connected to the exhaust at low pressure. The supply and exhaust pneumatic paths fluidly combine in the pneumatic summation component 27 and connect to the outlet 6a of the upper chamber 2. Analogously, I/P transducer 20c and the corresponding pneumatic amplifier 24c are fluidly connected to the supply of pressurized control fluid, while 20d and the corresponding pneumatic amplifier 24d are fluidly connected to the exhaust at low pressure. The supply and exhaust pneumatic paths fluidly combine in the pneumatic summation component 28 and connect to the outlet 6b of the lower chamber 3. In some implementations, a single pneumatic device may combine multiple pneumatic functions. For example, the same device may comprise pneumatic amplifiers 24a, 24b and the pneumatic summation component 27.

In operation, the processing unit 16 may communicate with the interface 18 to obtain the set point of position as well as a constraint on the stiffness of the actuator 1. The processing unit 16 may also obtain sensor readings via the sensors 11, 14a and/or 14b to obtain the displacement of the actuator 1 and the pressures in the chambers of 2 and 3 of the actuator 1. The processing unit 16 may compute a numerical indicator of the stiffness of an actuator from the collected sensor data (e.g., as an average or weighted sum of the pressure of chambers 2 and 3) in accordance to the way that the constraint on the numerical indicator of the stiffness of the actuator is defined. The constraint on actuator stiffness may be defined, in some implementations, as an acceptable range (or "deadband") for the average of the pressures in the two chambers. In these implementations, the processing unit 16 may compute two control signals and communicates the signals to activate one or more four transducers 20a-d to adjust pressure in one or both of the chambers 2 and 3 to adjust stiffness of the actuator 1.

Only one of the transducers 20a-20d may need to be activated for each pneumatic chamber at a given time in order to change the pressure in the chamber. Therefore, two control signals computed by the processing unit 16 may be sufficient, as the two signals may activate two of the four transducers 20a-20d for each new control action.

In some implementations, the positioner 10 may use only two I/P transducers, if each of the two transducers is configured to control bi-directional flow in and out of the two respective chambers.

Figure 2:
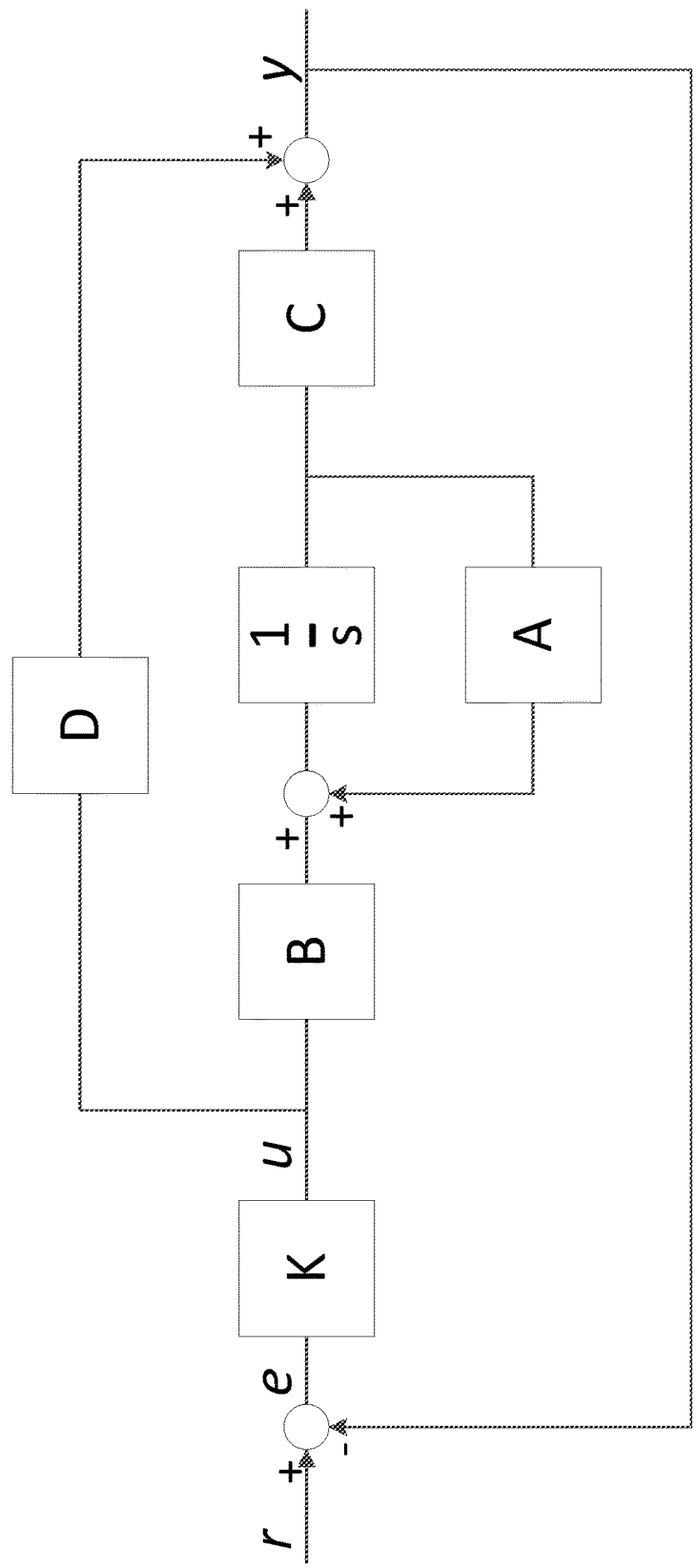
FIG. 2 is a diagram of a state-space description of a control loop for controlling operation of a double-acting pneumatic actuator.

Example Control Loop for Controlling Position and/or Crossover Pressure in a Pneumatic Actuator FIG. 2 illustrates a control loop for implementing a Multiple Input Multiple Output (MIMO) implementation of the systems and methods described in this detailed description. This MIMO control algorithm may, for example, control actuator position and/or actuator stiffness ("crossover pressure") in a double-acting pneumatic actuator. An error vector e may be computed by subtracting an output vector y from an input vector r. The error vector may then be multiplied by a gain matrix K, to obtain one or more control signals in vector u. An integrating block 1/s, a system matrix A, an input matrix B, an output matrix C and a feed-through matrix D describe the effect of the control signals u on the output y. The reference vector r and the output vector y may comprise the same parameters of the system. These parameters may include the actuator position, and, in implementations in which the stiffness is simultaneously controlled, a numerical indicator of stiffness. The parameters may also include, in some implementations, the velocity of the actuator, with the reference of the velocity usually set to zero.

The control signals may be computed as weighted sums of the errors in position and the stiffness indicator. In another implementation of this computation, one may add a factor for the velocity of the actuator, which may also be interpreted as the rate of change in the position error and may be computed using the difference in consecutive measurements of position. The resulting control signal can then be written as:

$$C_a = K_{p,a} e_x - K_{v,a} e_{\dot{x}} - K_{s,a} e_s$$

$$C_b = -K_{p,b} e_x + K_{v,b} e_{\dot{x}} - K_{s,a} e_s$$

wherein $C_a$ is the control signal for the upper chamber, $C_b$ is the control signal for the lower chamber, $K_{p,a}$ and $-K_{p,b}$ are the position feedback gains for chambers, $-K_{v,a}$, $K_{v,b}$ are the velocity feedback gains, $-K_{s,a}$, $-K_{s,b}$ are the feedback grains for the indicator of stiffness, $e_x$ is the error in the position, $e_{\dot{x}}$ can be interpreted as rate of change of the error in position, or simply, as the velocity of the actuator and $e_s$ is the error in a numerical indicator of stiffness. In some implementations, the numerical indicator of stiffness may be replaced by a pressure indicator, and $e_s$ is then replaced by the error in the pressure indicator, $e_p$.

Control signals $C_a$ and $C_b$ may be computed in a variety of ways different from the weighted sum of the errors. For example, the feedback gains may change values depending on the errors or other process parameters. Also, terms proportional to errors raised to integer or non-integer powers may be included in the computation of errors.

The effect of control signals $C_a$ and $C_b$ on the I/P transducers may depend on a given implementation. In one implementation, analog I/P transducers may be used, and the control signals may set the magnitude of flow rates into or out of the corresponding chambers, with the flow rate magnitudes, for example, proportional to the control signals. In another implementation, especially suitable for digital I/P transducers, the duration of a fixed flow rate may be controlled. For example, if $C_a$ is positive, while $C_b$ is negative, but its absolute value is twice that of $C_a$, then I/P transducers 20a and 20d in FIG. 1 may be activated with 20d activated for twice the duration of 20a. The resulting increase in the amount of the control fluid in chamber 2 and the decrease in the control fluid in chamber 3 may both contribute to the downward movement of the piston 4 and the stem 5. Additionally, if the decrease in the control fluid amount in chamber 3 is greater than the increase in chamber 2, the stiffness of the actuator may decrease.

The control of flow rate durations, as opposed to the flow rate magnitudes, may be particularly applicable to the implementation of a control method in which the control actions are updated at pre-defined intervals. The fraction of the interval during which a given flow path is active can be proportional to the magnitude of the corresponding control signal, the magnitude determining the duration of an electrical pulse to the associated I/P transducer.

Efficiently Controlling Crossover Pressure

The implementations described above may enable a valve controller to simultaneously control actuator position and crossover pressure near to their respective set points (SP) using a control algorithm (e.g., a Multiple Input Multiple Output (MIMO) control algorithm).

In practice, a deadband (DB) may be introduced to each of the controlled process variables (PV, e.g., position and crossover pressure), the deadband corresponding to an allowed range of process variable values above and below the set point. Traditionally, an objective of a control algorithm executed by a controller is to drive each controlled process variable within its deadband via a "control action." To that end, for each controlled process variable, the controller may set (and frequently update) an error variable e, corresponding to the difference between the process variable and an acceptable value of the process variable. Traditionally, e is may be calculated as:

$$e=(SP-PV)-DB$$

In other words, e is equal to the difference between the set point and the process variable, minus the allowance provided by the deadband. By this calculation of e, the value of e is zero when the process variable is at either edge of the deadband, and e linearly increases as the difference between the set point and the process variable increases. The controller may execute the control algorithm using e (e.g., as an input in a MIMO control algorithm) to drive e to 0, thus bringing the process variable within the deadband. Once each controlled variable is within the deadband, the controller may shut off until a process variable exits its deadband.

A disadvantage of employing this traditional approach is that, during a period of control, the controlled process variable will tend to settle at an edge of the deadband, and may oscillate around the deadband due to control fluid leaks and/or other disturbances in a process control system. Additional control actions may be necessary each and every time the process variable exits the deadband (i.e., when e achieves a non-zero value), which may occur significantly often when each control action drives the process variable only to the edge of its acceptable range, especially when the control algorithm controls multiple process variables (e.g., crossover pressure and actuator position) via the approach described above. Such frequent control actions may require significant power or other resource consumption, and may further cause significant wear upon process control system components.

Figure 3A:
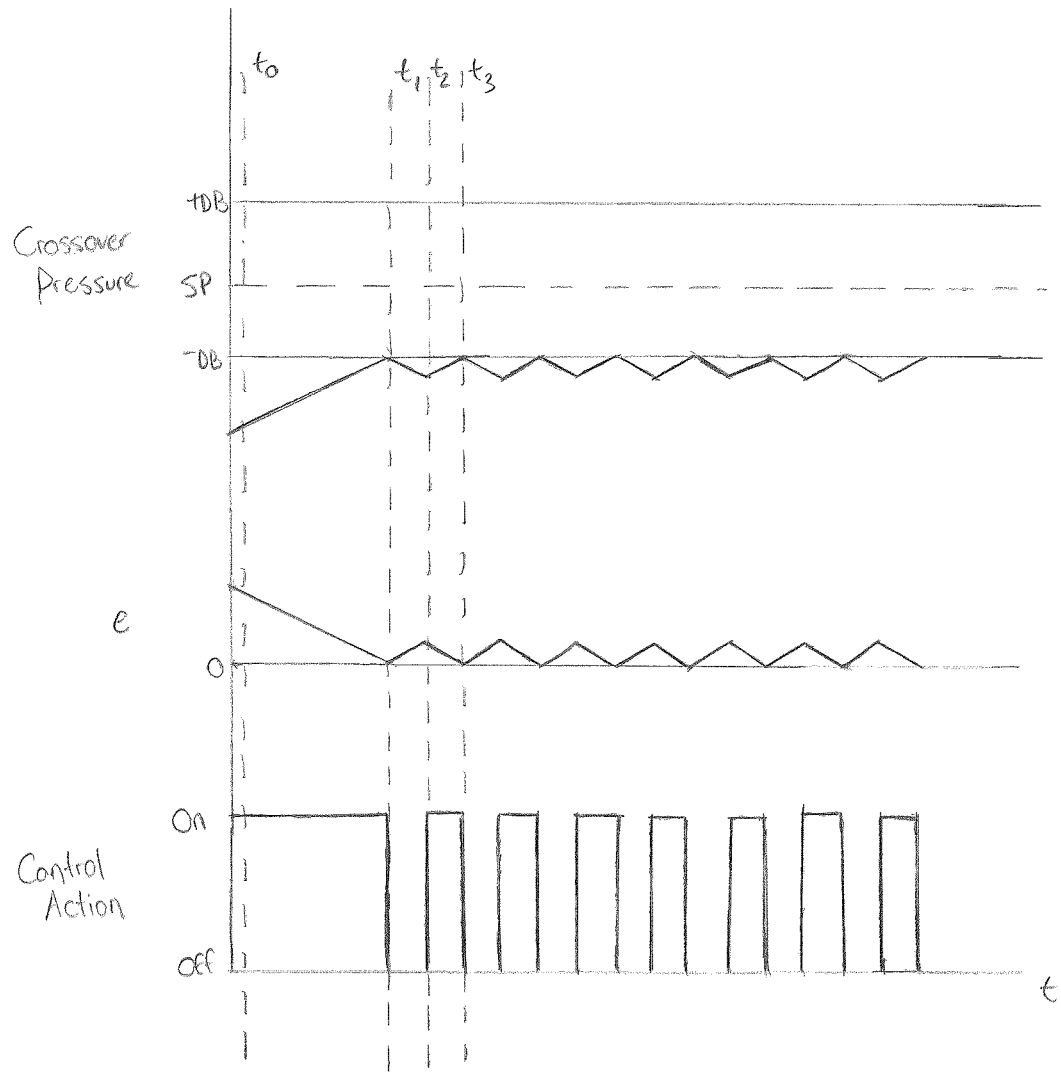
FIG. 3A is a chart plotting a crossover pressure, an error variable, and resulting control actions in an example implementation of traditional techniques of controlling crossover pressure in a double-acting pneumatic actuator.

To illustrate these difficulties, FIG. 3A charts possible behavior of a crossover pressure, a crossover pressure error variable e, and control actions taken to drive crossover pressure in an example implementation wherein a controller employs the traditional technique during a control period t to control crossover pressure (and, in some embodiments, simultaneously another process variable such as actuator position) in a double-acting pneumatic actuator. In some embodiments, a controller comprising one or more processing units may monitor the crossover pressure, calculate e, and/or initiate control actions to control the crossover pressure. It should be appreciated that the control behaviors described herein are exemplary only, and actual behavior of crossover pressure, e, and control actions may vary from the behaviors illustrated in FIG. 3A.

At a time $t_0$ corresponding to the beginning of the control period t, crossover pressure is outside of the deadband (in this case, below −DB). Thus, the controller may set the crossover pressure error variable e to a non-zero value. The controller may initiate control action (e.g., addition of pressure to one or both actuator chambers) via the control algorithm to raise the crossover pressure to edge of the deadband, and thus e to zero at a subsequent time $t_1$. Optimally, at $t_1$, the controller may cease control action with respect to crossover pressure.

However, control action to raise crossover pressure may necessarily include adding pressure to one or both actuator chambers. Because actuator position varies based upon the pressure differential in the two chambers, driving crossover pressure may also drive the actuator position outside of its own deadband, especially the controller controls actuator position via the same control algorithm and/or technique as crossover pressure (i.e., driving position to the edge of a position deadband). When position is driven outside of its own deadband, the controller may need to perform another control action at $t_1$ to correct the position error (and/or another process variable error) that may be observed when driving of crossover pressure ceases at $t_1$ The control action taken with respect to position may cause a change in the crossover pressure, causing a crossover pressure error to again be observed at a subsequent time $t_2$. Accordingly, further control action may be necessary from $t_2$ until another time $t_3$ to correct the crossover pressure error. In effect, a cycle may result, wherein control action to drive crossover pressure within its deadband necessitates subsequent control action to drive actuator position back within its own respective deadband, and vice versa.

Thus, attempts to utilize a traditional control algorithm to control crossover pressure and actuator position may necessitate undesirably frequent control actions introduce additional complications to an already difficult endeavor of actuator position control. It should be noted that, in process control environments, position control may require extremely tight precision. In some implementations, for example, only a maximum position variance of 0.125% above or below set point may be allowed. Crossover pressure, meanwhile, may not require as much precision, and an variance of 5% or 10% around its set point, for example, may be acceptable.

To mitigate the drawbacks of the above-described traditional control techniques, an improved control technique is envisioned, wherein a control algorithm may execute modified setting of the crossover pressure error variable to driver crossover pressure not just to the edge of its deadband, but closer to its set point, which may allow for more focused control of actuator position and/or other controlled process variables. According to this new technique, the calculation of the crossover pressure error variable e may differ based upon the whether the observed crossover pressure has exited its deadband, and whether the crossover pressure has reached or passed its set point. At a time at which the crossover pressure is determined to be outside of its deadband, e may be defined as:

$$e=(SP-PV)$$

wherein PV represents the value of the crossover pressure. The control algorithm may utilize e, and the controller algorithm may initiate a control action drive the crossover pressure to its set point, thus driving e to zero, according to this modified calculation of e. Once the crossover pressure reaches its set point (i.e., e equals zero) or passes its set point (i.e., e changes sign) the controller may set e as zero for as long as the crossover pressure remains within its acceptable deadband range. Thus, no control action to correct crossover pressure may be necessary while the set crossover pressure error variable e is zero.

Figure 3B:
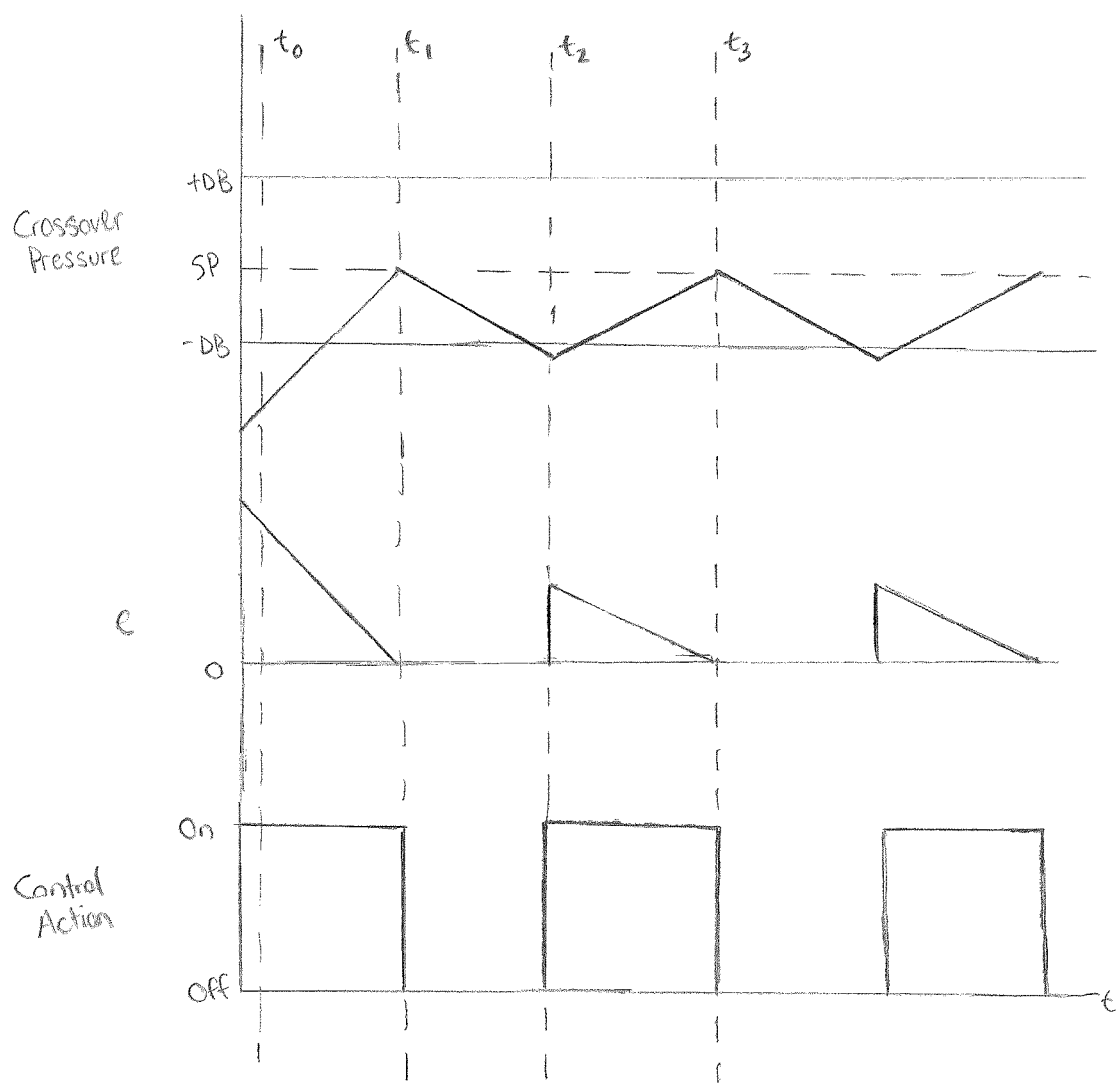
FIG. 3B a chart plotting a crossover pressure, an error variable, and resulting control actions in an example implementation of improved techniques of controlling crossover pressure in a double-acting pneumatic actuator.

To illustrate the benefits of this improved technique, FIG. 3B charts possible behavior of a crossover pressure, a crossover pressure error variable e, and control actions taken to drive crossover pressure in an example implementation wherein a controller employs the improved technique during a control period t to control crossover pressure (and, in some embodiments, simultaneously another process variable such as actuator position) in a double-acting pneumatic actuator. In some embodiments, a controller comprising one or more processing units may monitor the crossover pressure, calculate e, and/or initiate control actions to control the crossover pressure. It should be appreciated that the control behaviors described herein are exemplary only, and actual behavior of crossover pressure, e, and control actions may vary from the behaviors illustrated in FIG. 3B.

At a time $t_0$ corresponding to the beginning of the control period t, crossover pressure is outside of the deadband (in this case, below −DB). Thus, the controller may calculate the difference between the crossover pressure and the set point, and set e to the calculated difference. The controller may initiate control action to drive the crossover pressure to its set point, thus driving e to zero. Once e reaches zero or changes sign (i.e., as crossover pressure passes its set point) at a subsequent time $t_1$, control action for driving crossover pressure may cease the controller may shut off.

Via this improved technique, once e reaches zero or changes sign at $t_1$, the controller may set e to zero for as long as the monitored crossover pressure remains in its deadband (i.e., at or between +DB and −DB), in this case, until a time $t_2$, which may be substantially further from $t_1$ than was observed in the traditional control technique. With e set to zero, the controller may not need to perform control action to correct crossover pressure during a "zero interval" between $t_1$ and $t_2$. During this zero interval, any control actions taken by the controller may be directed to controlling position and/or other process variables that may require particularly fine control. At $t_2$, the controller may recalculate and set e to the difference between the crossover pressure and the set point (causing the spike in e visible in FIG. 3B) A resulting control action may drive the crossover pressure back to its set point from $t_2$ to another time $t_3$. At $t_3$, crossover pressure is once again near the middle of its deadband, and another zero interval after $t_3$ may enable the controller to avoid further control actions, and/or to finely control position and/or other controlled process variables.

In effect, via this improved control technique, a wide range of values are possible where crossover pressure error e is defined as zero and thus does not affect controller output, simplifying control by allowing for more precise control actions to be performed to finely control actuator position, and/or to reduce wear upon process control components caused by frequent cycling of control actions.

Figure 4:
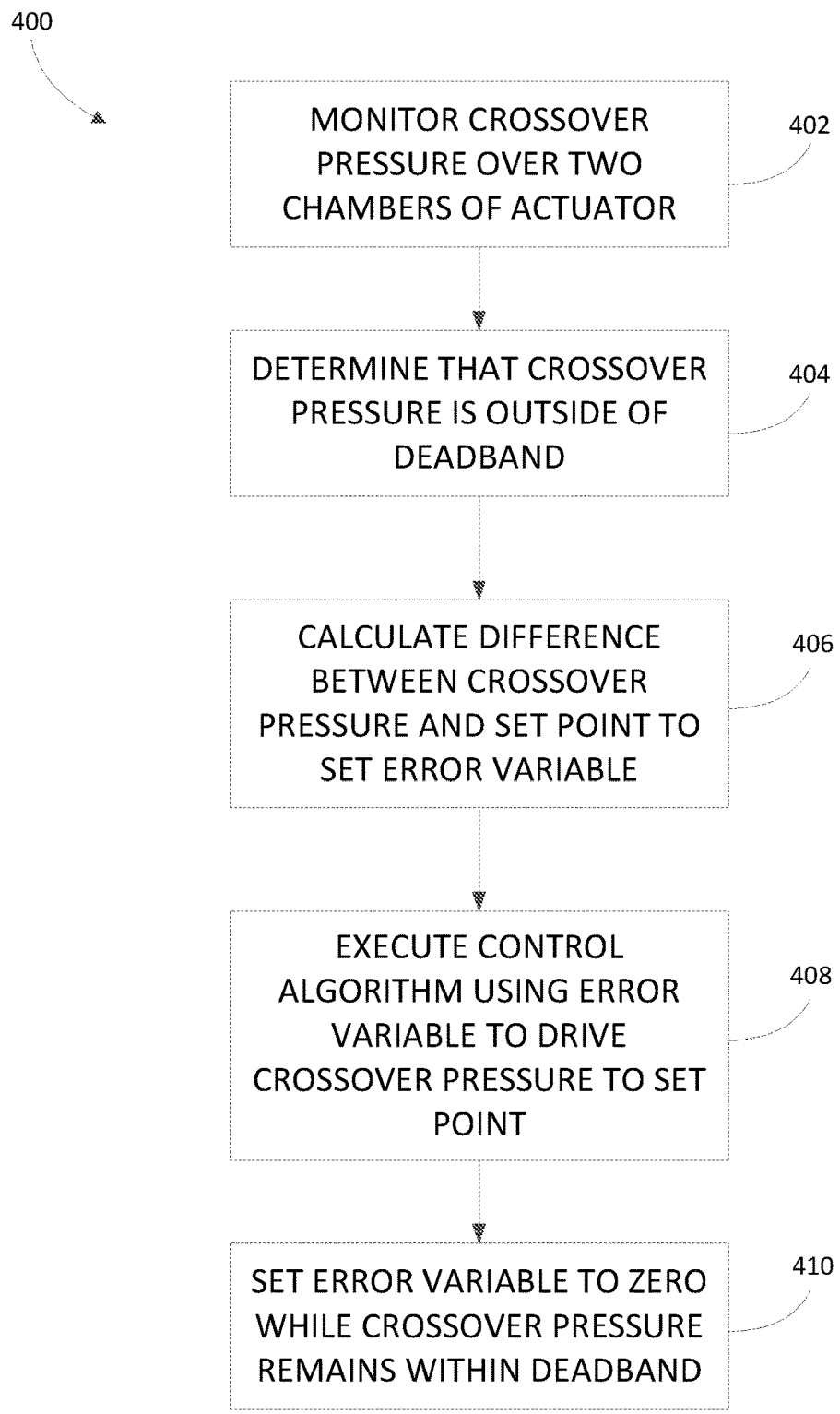
FIG. 4 is a flow diagram of an example method for digitally controlling crossover pressure in a double-acting pneumatic actuator.

Example Method for Controlling Crossover Pressure in a Double-Acting Pneumatic Actuator FIG. 4 illustrates an example method 400 for controlling crossover pressure in a double-acting pneumatic actuator. The method 400 may be performed, for example, via a digital valve controller (DVC), a programmable logic controller (PLC), and/or another controller, which may be disposed within the processing unit 16 described with regard to FIG. 1. The controller may be configured to execute a control algorithm, such as a Multiple Input Multiple Output (MIMO) control algorithm (e.g., the control loop of FIG. 2), to control both crossover pressure and actuator position in the actuator over a period of time in a process environment.

The method may include monitoring a crossover pressure (or "stiffness") over two pneumatic chambers of a double-acting pneumatic actuator (402). Monitoring the crossover pressure may include receiving an indication of pressure in the first chamber of the two pneumatic chambers and an indication of pressure in a second chamber of the two chambers. The pressure indications may be obtained, in some embodiments, via two pressure sensors disposed at the respective two chambers. Monitoring the crossover pressure may include calculating the crossover pressure based upon the indicated pressures (e.g., as a weighted sum of the two indicated pressures, as an average of the two indicated pressures, or via some other calculation). In some implementations, a controller may be configured to frequently (e.g., at predetermined intervals) monitor the crossover pressure by acquiring frequent indications of pressure and by frequently calculating the crossover pressure during a period of operation in a process environment.

Generally, the crossover pressure may be monitored and controlled with respect to a desired set point, and may be defined, for example, via a human operator and/or a control program (e.g., a program pre-installed or otherwise included at a digital valve controller). The defined crossover pressure may be static during a control period, or alternatively may be dynamic, varying based upon time, available supply pressure, and/or detected actuator position, for example. A predefined deadband range may correspond to a range of crossover pressure values above and below the set point (e.g., +DB to −DB, including SP, as depicted in FIGS. 3A and 3B). The deadband range may be defined, for example, as a percentage allowance on either side of the set point (e.g., +/−5% or +/−10% crossover pressure difference from set point), and may be defined via a human operator and/or a control program at a controller.

The method 400 may include determining, via the monitoring of the crossover pressure, that the monitored crossover is outside of the predefined deadband range (404). The method 400 may include, in response to determining that the monitored crossover pressure is outside of the deadband range, calculating a difference between the monitored crossover pressure and the crossover pressure set point, and using the calculated difference to set a crossover pressure error variable (406).

The method 400 may include executing a control algorithm using the error variable in order to drive the monitored crossover pressure to the set point (408). In some implementations, a MIMO control algorithm may execute (e.g., according to the diagram of FIG. 2) using the crossover pressure error variable as one input of multiple inputs, wherein the multiple inputs may additional include a position error (computed via any of the one or more of the control techniques described herein), such that the MIMO control algorithm may control both crossover pressure and actuator position in the double-acting pneumatic actuator. Driving the monitored crossover pressure may include outputting one or more control signals (e.g., as described herein, including providing control signals to one or more I/P transducers) to affect the crossover pressure, which may continue to be monitored (e.g., at a predetermined frequency) during some or all of execution of the method 400.

Once the monitored crossover pressure has reached or passed the set point (i.e., once the error variable has reached zero or changed sign), the method 400 may include, in response to determining that the monitored crossover pressure has reached or passed the set point, setting the error variable to zero while the monitored crossover pressure remains within the deadband range (410). In other words, crossover pressure may continue to be monitored, and for as long as the crossover pressure does not exit the deadband range, the error variable may remain zero. A controller, for example, may set and maintain the error variable at zero such that additional control action to affect crossover pressure may not be taken while crossover pressure remains within the acceptable deadband range. In effect, a period of time is achieved wherein the controller may execute more focused control of actuator position and/or other aspects of the process environment.

Accordingly, the method 400, in some implementations, may further include, subsequently to setting the crossover pressure error variable to zero, determining that the monitored crossover pressure is again outside of the deadband range. In response to this determination, the method 400 may include recalculating the difference between the monitored crossover pressure and the crossover pressure set point, at set the error variable as the difference. Consequently, a controller, for example, may initiate control action by executing the control algorithm as previously described to drive the monitored crossover pressure back to its set point, allowing for another period during which control action to affect crossover pressure may not be necessary.

At any time during execution of the method 400, the method 400 may additionally include monitoring and/or controlling actuator position (and/or another one or more process parameters) in the same double-acting pneumatic actuator, via any one or more of the control techniques described herein. In some implementations, a controller executing a MIMO control algorithm to control crossover pressure may additionally control actuator position, for example, via monitoring actuator position (e.g., via an actuator position sensor) and using an input of an actuator position error variable (set via any one or more of the techniques described herein) in combination with the crossover pressure error variable to execute the MIMO control algorithm.

The method 400 may include additional, alternate, or fewer actions, including those described herein.

Additional Considerations

The foregoing detailed description has been given for clearness of understanding only, and no unnecessary limitations should be understood therefrom, as modifications will be obvious to those skilled in the art. Additionally, throughout this specification, plural instances may implement components, operations, or structures described as a single instance. Although individual operations of one or more methods are illustrated and described as separate operations, one or more of the individual operations may be performed concurrently or may be performed in an alternate order to the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Throughout this specification, actions described as performed by the processing unit 16 or other similar devices (or routines or instructions executing thereon) generally refer to actions or processes of a processor manipulating or transforming data according to machine-readable instructions. The machine-readable instructions may be stored on and retrieved from a memory device communicatively coupled to the processor. That is, methods described herein may be embodied by a set of machine-executable instructions stored on a non-transitory computer readable medium (i.e., on a memory device). The instructions, when executed by one or more processors of a corresponding device (e.g., a server, a mobile device, etc.), cause the processors to execute the method. Where instructions, routines, modules, processes, services, programs, and/or applications are referred to herein as stored or saved on a computer readable memory or on a computer readable medium, the words "stored" and "saved" are intended to exclude transitory signals.

Unless specifically stated otherwise, discussions herein using words such as "processing," "computing," "calculating," "determining," "identifying," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

When implemented in software, any of the applications, services, and engines described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, persons of ordinary skill in the art will readily appreciate that the examples provided are not the only way to implement such systems.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

The invention claimed is:

1. A method of digitally controlling a double-acting pneumatic actuator, the method comprising:
    monitoring a crossover pressure over two pneumatic chambers of the double-acting pneumatic actuator;
    determining that the monitored crossover pressure is outside of a predefined deadband range corresponding to values extending above and below a crossover pressure set point;
    in response to determining that the monitored crossover pressure is outside of the deadband range, determining a difference between the monitored crossover pressure and the crossover pressure set point to generate a crossover pressure error;

executing a control action to drive the monitored crossover pressure to the crossover pressure set point, using the crossover pressure error;
in response to determining that the monitored crossover pressure has reached the set point, setting the crossover pressure error to zero; and
maintaining the crossover pressure error at zero while the monitored crossover pressure is within the deadband range.

2. The method of claim 1, wherein the control action is a first control action, the method further comprising executing a second control action to drive a position of the pneumatic actuator to a position setpoint.

3. The method of claim 2, wherein executing the first control action and the second control action includes implementing a multiple-input, multiple-output (MIMO) control scheme.

4. The method of claim 1, further comprising determining that the monitored crossover pressure has reached the set point based on a change in a sign of the crossover pressure error.

5. The method of claim 1, wherein monitoring the crossover pressure comprises (i) receiving an indication of pressure in a first chamber of the two pneumatic chambers of the pneumatic actuator, (ii) receiving an indication of pressure in a second chamber of the two chambers of the pneumatic actuator, and (iii) determining the crossover pressure based on the indicated pressures in the first and second chambers.

6. The method of claim 5, wherein calculating the crossover pressure comprises calculating a weighted sum of the indicated pressures in the first and second chambers.

7. The method of claim 5, wherein calculating the crossover pressure comprises calculating an average of the indicated pressures in the first and second chambers.

8. A system comprising:
a double-acting pneumatic actuator having a first pneumatic chamber and a second pneumatic chamber;
a first sensor to determine pressure in the first chamber;
a second sensor to determine pressure in the second chamber; and
a controller configured to:
monitor a crossover pressure over the two pneumatic chambers using the first and second pressure measurements,
determine that the monitored crossover pressure is outside of a predefined deadband range corresponding to values extending above and below a crossover pressure set point,
in response to determining that the monitored crossover pressure is outside of the deadband range, determine a difference between the monitored crossover pressure and the crossover pressure set point to generate a crossover pressure error,
execute a control action to drive the monitored crossover pressure to the crossover pressure set point, using the crossover pressure error,
in response to determining that the monitored crossover pressure has reached the set point, set the crossover pressure error to zero, and
maintain the crossover pressure error at zero while the monitored crossover pressure is within the deadband range.

9. The system of claim 8, wherein the control action is a first control action, the controller further configured to execute a second control action to drive a position of the pneumatic actuator to a position setpoint.

10. The system of claim 9, wherein to execute the first control action and the second control action, the controller implements a multiple-input, multiple-output (MIMO) control scheme.

11. The system of claim 8, the controller further configured to determine that the monitored crossover pressure has reached the set point based on a change in a sign of the crossover pressure error.

12. The system of claim 8, wherein to monitor crossover pressure, the controller is further configured to (i) receive an indication of pressure in a first chamber of the two pneumatic chambers of the pneumatic actuator, (ii) receive an indication of pressure in a second chamber of the two chambers of the pneumatic actuator, and (iii) determine the crossover pressure based on the indicated pressures in the first and second chambers.

13. The system of claim 12, wherein to calculate the crossover pressure, the controller is configured to calculate a weighted sum of the indicated pressures in the first and second chambers.

14. The system of claim 12, wherein to calculate the crossover pressure, the controller is configured to calculate an average of the indicated pressures in the first and second chambers.

15. A controller configured to digitally control a double-acting pneumatic actuator, the controller including:
processing hardware; and
a memory storing thereon instructions that, when executed by the processing hardware, cause the controller to execute a method including:
monitoring a crossover pressure over two pneumatic chambers of the double-acting pneumatic actuator,
determining that the monitored crossover pressure is outside of a predefined deadband range corresponding to values extending above and below a crossover pressure set point,
in response to determining that the monitored crossover pressure is outside of the deadband range, determining a difference between the monitored crossover pressure and the crossover pressure set point to generate a crossover pressure error,
executing a control action to drive the monitored crossover pressure to the crossover pressure set point, using the crossover pressure error,
in response to determining that the monitored crossover pressure has reached the set point, setting the crossover pressure error to zero, and
maintaining the crossover pressure error at zero while the monitored crossover pressure is within the deadband range.

16. The controller of claim 15, wherein the control action is a first control action, the method further comprising executing a second control action to drive a position of the pneumatic actuator to a position setpoint.

17. The controller of claim 16, wherein executing the first control action and the second control action includes implementing a multiple-input, multiple-output (MIMO) control scheme.

18. The controller of claim 15, the method further comprising determining that the monitored crossover pressure has reached the set point based on a change in a sign of the crossover pressure error.

19. The controller of claim 15, wherein monitoring the crossover pressure comprises (i) receiving an indication of pressure in a first chamber of the two pneumatic chambers of the pneumatic actuator, (ii) receiving an indication of pressure in a second chamber of the two chambers of the pneumatic actuator, and (iii) determining the crossover pressure based on the indicated pressures in the first and second chambers.

20. The controller of claim 19, wherein calculating the crossover pressure comprises calculating a weighted sum of the indicated pressures in the first and second chambers.

* * * * *

UNITED STATES PATENT AND TRADEMARK OFFICE
CERTIFICATE OF CORRECTION

PATENT NO. : 10,458,444 B2  
APPLICATION NO. : 15/718960  
DATED : October 29, 2019  
INVENTOR(S) : Michael R. Fontaine et al.

Page 1 of 1

It is certified that error appears in the above-identified patent and that said Letters Patent is hereby corrected as shown below:

In the Specification

At Column 3, Line 61, "may configured" should be -- may be configured --.

At Column 6, Line 38, "$C_b=-K_{p,b}e_x+K_{v,b}e_{\dot{x}}-K_{s,a}e_s$" should be -- $C_b=-K_{p,b}e_x+K_{v,b}e_{\dot{x}}-K_{s,b}e_s$ --.

At Column 8, Line 32, "$t_1$ The" should be -- $t_1$. The --.

Signed and Sealed this  
Twenty-seventh Day of October, 2020

Andrei Iancu  
*Director of the United States Patent and Trademark Office*